July 18, 1950 M. P. HOLMES 2,515,710
GEAR-SHIFTING MECHANISM
Filed May 28, 1948 3 Sheets-Sheet 2
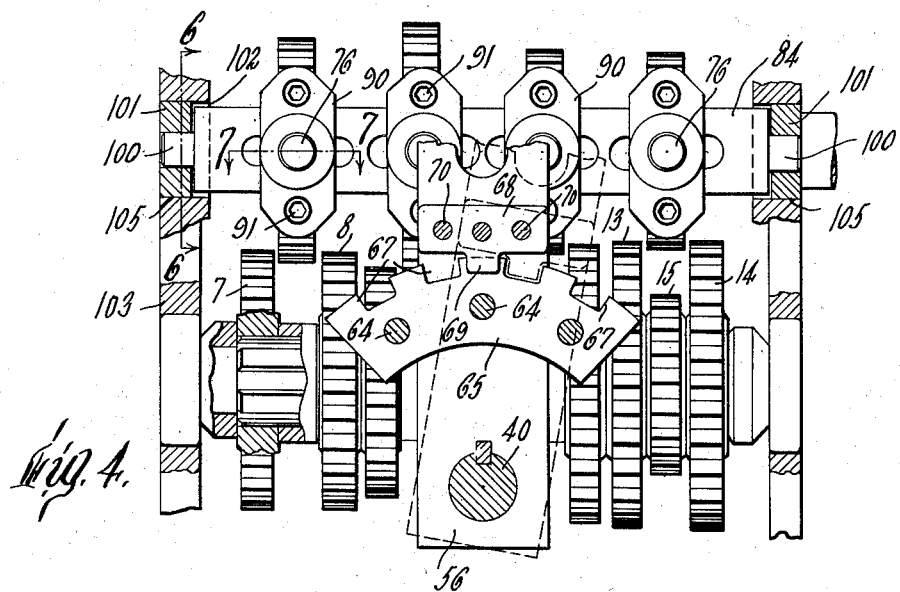
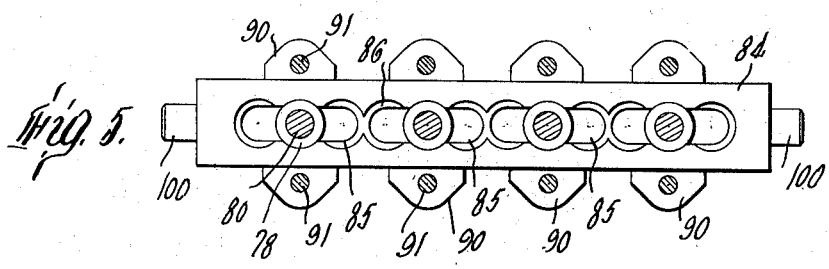
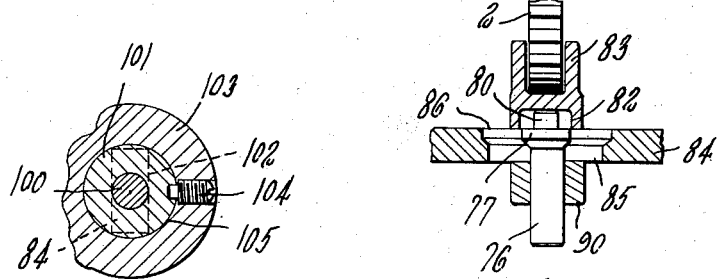 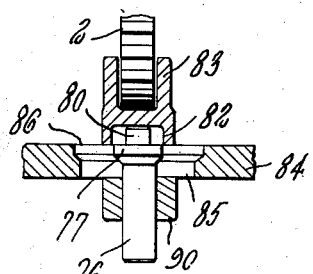
INVENTOR.
Morris P. Holmes
BY
ATTYS

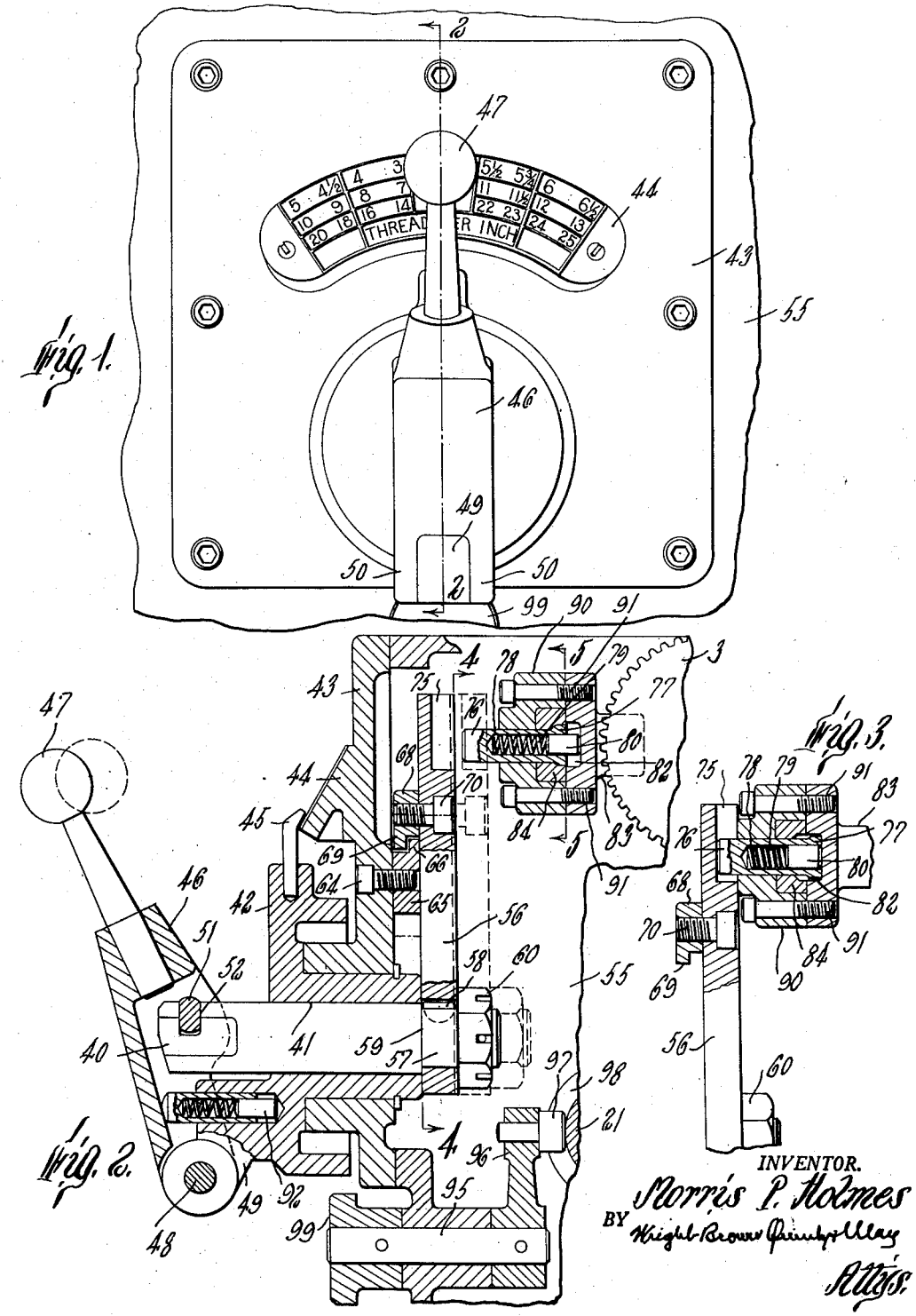

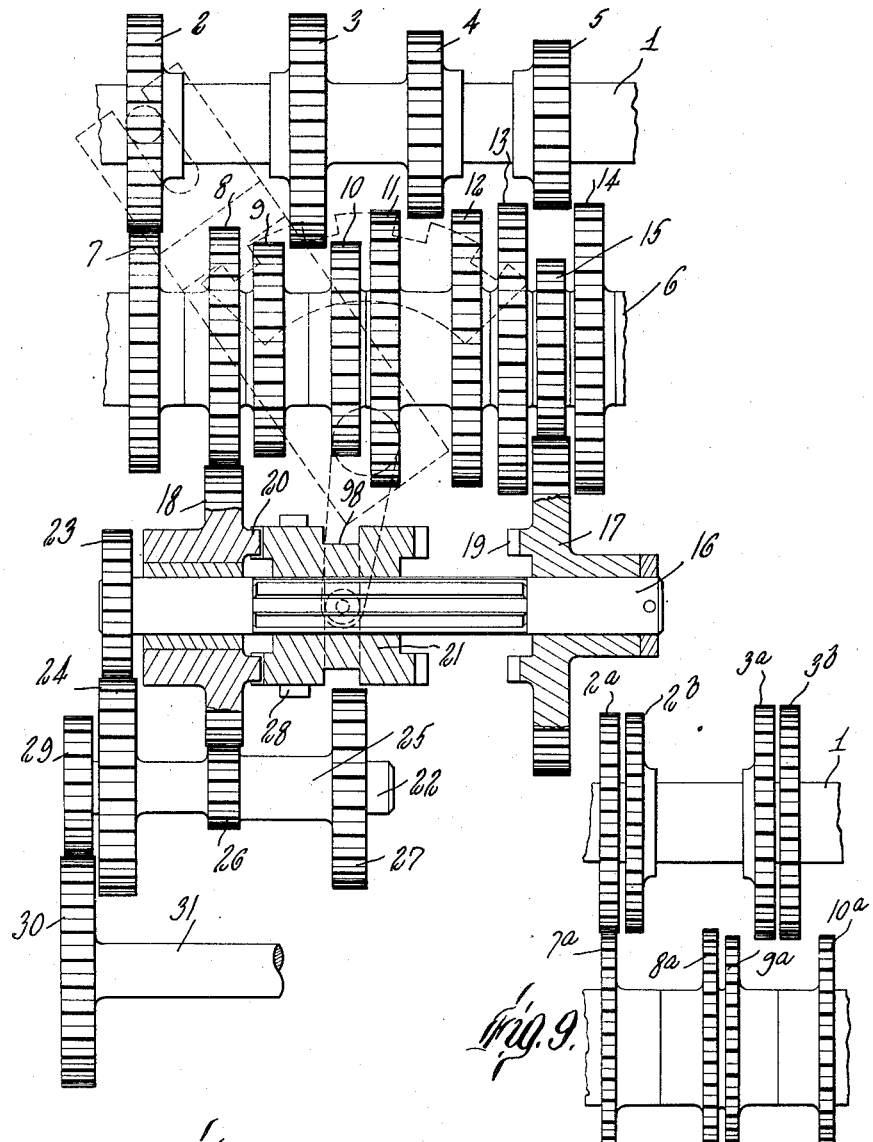

Patented July 18, 1950

2,515,710

UNITED STATES PATENT OFFICE 2,515,710

GEAR-SHIFTING MECHANISM

Morris P. Holmes, Claremont, N. H., assignor to Jones & Lamson Machine Company, Springfield, Vt., a corporation of Vermont Application May 28, 1948, Serial No. 29,805

2 Claims. (Cl. 74—475)

This invention relates to gear shifting mechanism by which any of a plurality of driven speeds may be obtained from a constant driving speed.

One object of the present invention is to obtain a large selection of different speeds with a simple shifting mechanism.

A further object is to provide a simple interlock which insures against gear interference.

Still another object is to provide a supplemental shift mechanism by which the possible number of different speed selections of the main shift mechanism is multiplied.

For a complete understanding of this invention, reference may be had to the accompanying drawings in which Figure 1 is a fragmentary front elevation of a shift mechanism embodying the invention.

Figure 2 is a detail sectional view on line 2—2 of Figure 1, certain of the parts being shown in gear shifted position in dotted lines.

Figure 3 is a view similar to a portion of Figure 2, but showing parts in gear shifting position.

Figures 4 and 5 are sectional views on lines 4—4 and 5—5, respectively, of Figure 2.

Figures 6 and 7 are detail sectional views on lines 6—6 and 7—7, respectively, of Figure 4.

Figure 8 is a diagram of the gear train.

Figure 9 is a view similar to a portion of Figure 8, but showing a modification.

Referring first to Figure 8, at 1 is indicated a drive shaft arranged to be rotated by any suitable means (not shown). This shaft has a plurality of gears slidable axially thereon, as shown there being four gears 2, 3, 4 and 5 of different sizes. Either selected of these four gears forms a portion of the gear train through which motion is transmitted from the shaft 1. This shaft 1 drives a shaft 6 having secured thereto as by suitable splines, as shown in Figure 4, pairs of gears 7 and 8, 9 and 10, 11 and 12, 13 and 14. The two gears of each pair have slightly different numbers of teeth, but so near alike that the gears 2, 3, 4 and 5 may be selectively meshed therewith as they are slid respectively along the shaft 1. Thus the gear 2 may be brought selectively into meshing condition with either of the gears 7 and 8, it being shown in mesh with the gear 7. The gear 3 may be brought selectively into mesh with the gears 9 and 10, but as shown is in an intermediate neutral axial position out of engagement with both of the gears 9 and 10. Similarly the gear 4 may be brought into mesh with either of the gears 11 or 12, but is shown in an intermediate neutral position out of engagement with either, and the gear 5 may be brought into mesh with either of the gears 13 and 14 but is shown in its intermediate neutral position out of mesh with either. The shaft 6 also has fixed thereto a gear 15 by which motion is transmitted from it to a gear 17 which is journaled on a shaft 16, and the gear 8 is also shown as meshing with the gear 18 also journaled on the shaft 16. The gears 17 and 18 are provided with opposed clutch faces 19 and 20 with which may be selectively coupled a double clutch member 21 splined on the shaft 16. Thus when the clutch 21 is in its left hand position shown, the shaft 16 is driven through the gear 18, and when the clutch element 21 is moved to its extreme right hand position, the shaft 16 is driven from the gear 17 through the clutch face 19. The shaft 16 may drive a shaft 22 through intermeshing gears 23 and 24 carried by the respective shafts. The shaft 22 has journaled thereon a hub 25 carrying a pinion 26 and a gear 27. In an intermediate position of the clutch 21, a gear 28 thereon meshes with the gear 27 so that the shaft 16 is then driven from the gear 18 through the pinion 26, the hub 25, the gear 27, and the clutch gear 28. The shaft 22 has fixed thereto a gear 29 which meshes with a gear 30 on a driven shaft 31. The shaft 6 may thus drive the gear 29 at three selected speed ratios, depending upon the three positions of the clutch 21, its left hand position engaging the gear 18, its intermediate position in which the gears 27 and 28 are engaged, and its right hand position in which it is clutched to the gear 17. The shaft 6 may be driven from the shaft 1 at any selected of eight speeds, depending upon which of the gears 2, 3, 4 and 5 is driving and which of its two driven gears the selected gear of the four is engaged.

It will be noted that the single gears 2, 3, 4 and 5 mesh with gears having slightly different numbers of teeth but where the change of ratio is to be substantial, a single driving gear cannot be used satisfactorily to drive two other gears of such widely different numbers of teeth. Where this is so, the arrangement shown in Figure 9 may be employed, where instead of the single sliding gears 2, 3, 4 and 5, pairs of 2a, 2b, 3a and 3b, etc. are employed, each arranged to mesh with its own gear 7a, 8a, 9a, 10a, the gear 2a meshing only with the gear 7a and the gear 2b meshing only with the gear 8a, etc.

The shifting of the shift gear devices comprising either the single gears 2, 3, 4 and 5, or the double gears 2a, 2b, 3a, 3b, etc. are selectively accomplished by mechanism shown in Figures 1 to 7, inclusive. Referring to these figures, this mechanism comprises a rockable and axially movable shaft 40 on which is mounted a hub 41 provided with a disk portion 42. This hub 41 is journaled and retained against axial motion in a casing cover plate 43 having a dial segment 44. An indicator pointer 45 is secured to the disk portion 42 and engages over the dial segment 44 to indicate various angular positions of the disk 42 and also of the shaft 40. The shaft 40 is slidable through the hub 41 and is connected for such sliding motion to a hand lever 46 having a handle 47. The lever 46 is fulcrumed at 48 to an ear 49 extending forwardly from the disk 42, the handle 46, as shown, being forked with the two sides 50 engaging on opposite sides of the ear 49. The inner face of the lever 46 is recessed to receive the forward end of the shaft 40 and this recess is bridged by a bar 51 carried by the lever 40 and which engages in a slot 52 in the shaft 40.

Within the casing 55 which contains the gear train and back of the cover plate 43, the shaft 40 has fixed thereto an arm 56. This arm is carried on a reduced diameter portion 57 of the shaft 40, and is keyed thereto as by the key 58 and it is held against an annular shoulder 59 of the shaft 40 as by a castle nut 60. This arm 56, therefore, partakes of both the rocking and axial motions of the shaft 40.

To the back face of the cover plate 43 there is secured as by screws 64 an arcuate plate 65 (see Figures 2 and 4) which is provided with an upstanding flange 66 notched at intervals as at 67, these notches being equal in number to the gear shift devices. The arm 56 has secured to its outer face a plate 68 having a downwardly extending thinner flange portion 69, which when the arm 56 is in its forward position, rides between the rear face of the cover plate 43 and the forward face of the flange 66. This plate 68 is secured to the arm 56 as by screws 70.

As the arm 56 is rocked by rocking of the shaft 40 and handle 47, the member 69 describes an arc following the contour of the upper face of the member 65 and whenever the lug 69 is opposite to one of the notches 67, the arm 56 may be moved inwardly, the lug 69 then passing through the selected notch as the handle 57 is so moved. These notches 67 are so spaced that when the lug 69 is in position to pass through any of them, a groove 75 on the back face of the arm 56 is in angular position to engage an actuating element 76 of one of the shift devices.

Each of these actuating elements, as shown best in Figures 2 and 3, is a post of circular cross section having an enlarged diameter portion 77 toward its rear end and a central socket 78 for the reception of a coil spring 79 engaging a plug 80. This plug 80 bears against the base of a groove 82 in a yoke member 83, which, as shown in Figure 7, engages on opposite faces of the corresponding shift device. This groove 82 is of sufficient size to house the enlarged diameter portion 77 of the post 78 when this post is pressed rearwardly against the spring pressed plug 80 into the position shown in Figure 3. Just forwardly of the yoke member 83 there is positioned a bar 84 provided with a longitudinal slot 85 for each of the shift devices and through which slots the posts 78 ride. The rear face of the bar 84 is provided with end counter-bored portions 86 and a central similar portion within each of which the forward face of the enlarged diameter portion 77 of the corresponding post may engage, as shown in Figure 2, these counter-bored portions in cooperation with the enlarged diameter portion 77 constituting spring latch means tending to retain the posts 78 in any of the three positions to which each may have been moved. For instance, as shown in Figure 5, all the posts 78 are in their central positions within the slots 85, these central positions corresponding to the neutral positions of the yokes 83 when the shift devices are out of engagement with their driven gears. The bar 84 is embraced between the yokes 83 and forward plates 90, these plates 90 being secured to the corresponding yoke as by the screws 91. The posts, therefore, are permitted a limited axial motion but are normally pressed forwardly by the springs 78. When the handle 47 has been moved to desired angular position so that the pointer 45 engages between a pair of indications on the arcuate plate 44, the operator may push rearwardly on the handle 47 against the pressure of the spring pressed plug 92, causing the lug 69 to be passed through one of the slots 67, depending upon the angular position of the pointer 45 with reference to the dial, and in this position of the parts the groove 75 in the arm 56 is opposite to the post 78 of one of the shift devices, this post being at that time in neutral position. By pressing still further rearwardly on the handle 47, the post 78 may be retracted, bringing its enlarged diameter portion 77 out of the central counterbored portion of the corresponding slot 85, whereupon the handle 47, together with the face plate 42, may be rocked about the axis of the shaft 40 to an extent sufficient to bring the engaged post 78 into one or the other of the counterbored portions 85. On release of the handle 47 the spring pressed plugs 78 and 92 may push the handle forwardly sufficiently to allow the post 78 to seat itself in one of the end counterbored portions 86, while the lug 69 still remains back of the bar 66. Thus one of the shift devices has been shifted to interpose itself in the train of gearing while all the others are still in the neutral position.

In order that the handle 47 may be moved forwardly to initial position, it is necessary that it be rocked about the axis of the shaft 40 sufficiently to return the post 78 to its mid-position with respect to the corresponding slot 85, whereupon the lug 69 is positioned in alinement with one of the notches 67. It is now possible for the operator to permit the handle 47 to be moved to its forward inoperative position by the spring pressed plug 92, the lug 69 passing through one of the slots 67. The handle 47 is now free to be turned about the axis of the shaft 40 so that any other speed selection desired within the limits of the mechanism may be made, all of the shift devices then being in neutral position.

It will thus be seen that the handle cannot be moved in a manner to throw any of the shift devices into the gear train unless previously it has been turned to an angular position about its axis such as to permit the lug 69 to pass through one of the slots 67 and when it is so passed through, it engages that actuating element directly back of the particular slot 67 selected. At this time the selected device is in neutral position. It is now possible by moving the handle 47 further back to disengage or unlatch the selected shift device, whereupon by a further rocking motion imparted to the shaft 40 in either selected direction, the selected shift device may be moved to one or the other of its active positions. The handle 47 is then allowed to move forwardly slightly under the pressure exerted by the spring 78, whereupon the device which was shifted is now latched in active position, while all the other shift devices are in neutral.

Similarly, to disengage the selected shift device, it is first necessary to move it to neutral position before the lug may be passed through one of the notches 67 and permit the handle 47 to move to its foremost position where it is in condition for a further selection of gear ratios between the drive and driven shafts.

As shown in Figure 1, the arcuate portion 44 is provided with three concentrically arranged scales of values, the particular values indicated being in terms of thread per inch, this depending upon the particular gear shift made which determines the relative speeds of the drive and driven shaft. As shown the indications in each adjacent pair correspond to either right or left rocking motion of the handle 47 after the shaft 40 has been put in any of its neutral positions.

The three concentric sets of indications are employed to determine the selected position of the mechanism, depending upon not only the particular shift gear made operative, but depending, also, upon the particular drive between the shafts 16 and 21. As shown there are eight different device-engaging angular positions for the handle and there are three distinct drives at different speeds from the shaft 16 to the shaft 21. There are, therefore, twenty-four different speed ratios available in the mechanism as shown. This clutch element 21 may be adjusted by means convenient to the operator. For this purpose a shaft 95 is shown as journaled through the gear casing beneath the lever 46 and handle 47, this shaft 95 carrying on its rear end an arm 96 provided with a follower roll 97 for engagement in a peripheral groove 98 in the clutch element 21, the outer end of the shaft 95 being provided with a suitable knob or other device 99 to facilitate turning it with consequent axial adjustment of the shift clutch 21.

The bar 84, previously mentioned, is shown as supported at its ends in trunnions 100 which extend into blocks 101 notched across at their inner ends at 102 to receive the adjacent ends of the rectangular cross sectional portions of the bar 84. These blocks 101 have cylindrical peripheries and are mounted in circular recesses 105 in the wall members 103 and the blocks are held in position as by set screws 104 as shown in Figure 6.

As shown in Figure 1, the indications on the arcuate indicator 44 are for gear ratios which produce the number of threads to the inch in turned work shown in the respective arcuate system of indications, and where the number of these threads for each pair are relatively close, a single shift gear for each device, such as is shown in Figure 8, may be employed, but where greater differences in gear ratio are desired, it is preferable to employ the double gears for the shifting devices such as are shown in Figure 9.

From the foregoing description of an embodiment of this invention, it will be evident to those skilled in the art that various changes and modifications may be made therein.

I claim:

1. In combination, a gear train including a plurality of independently shiftable gear devices selectively interposed in said train, each of said devices having two spaced meshing positions and an intermediate neutral position, and each having an actuating element, said actuating elements being arranged in a series, an actuator comprising a rockable and axially movable shaft, an arm fixed to said shaft and having a portion arranged to sweep across said series of elements as said shaft is rocked and movable into and out of engagement with one or the other of said elements as said shaft is moved axially, a member having spaced slots each slot corresponding to one of said elements, a part carried by said arm in position to pass through one or another of said slots into or out of engagement with one of said elements when said arm is opposite to such element while the corresponding device is in its neutral position only and movable while in engagement with said element to and from either of its meshing positions, a rock member turnable with said shaft, and an actuating handle pivoted on said rock member and connected to said shaft such that rocking of said handle on its pivot moves said shaft axially and rocking of said handle about the axis of said shaft rocks said shaft, each of said elements being spring pressed in one direction, and a member having depressions corresponding to each position of said element for each position of the corresponding device and into which said element may extend to releasably lock said devices in any of their three positions.

2. In combination, a gear train including a plurality of independently shiftable gear devices selectively interposed in said train, each of said devices having two spaced meshing positions and an intermediate neutral position, and each having an actuating element, said actuating elements being arranged in a series, an actuator comprising a rockable and axially movable shaft, an arm fixed to said shaft and having a portion arranged to sweep across said series of elements as said shaft is rocked and movable into and out of engagement with one or the other of said elements as said shaft is moved axially, a member having spaced slots each slot corresponding to one of said elements, a part carried by said arm in position to pass through one or another of said slots into or out of engagement with one of said elements when said arm is opposite to such element while the corresponding device is in its neutral position only and movable while in engagement with said element to and from either of its meshing positions, a rock member turnable with said shaft, and an actuating handle pivoted on said rock member and connected to said shaft such that rocking of said handle on its pivot moves said shaft axially and rocking of said handle about the axis of said shaft rocks said shaft, each of said elements being spring pressed in one direction, and a member having depressions corresponding to each position of said element for each position of the corresponding device and into which said element may extend to releasably lock said devices in any of their three positions, said elements being engageable by said arm to be pressed thereby out of locking position on axial motion of said shaft in element-engaging direction.

MORRIS P. HOLMES.

REFERENCES CITED

The following references are of record in the file of this patent:

UNITED STATES PATENTS

| Number | Name | Date |
|---|---|---|
| 1,666,422 | Klausmeyer | Apr. 17, 1928 |
| 1,765,592 | Klausmeyer | June 24, 1930 |
| 1,831,194 | Radford | Nov. 10, 1931 |
| 2,242,027 | Fishburn | May 13, 1941 |
| 2,247,491 | Groene | July 1, 1941 |
| 2,331,704 | Lange | Oct. 12, 1943 |
| 2,356,522 | Kummich | Aug. 22, 1944 |
| 2,382,719 | Hoelscher | Aug. 14, 1945 |
| 2,431,727 | Bennett | Dec. 2, 1947 |